US009424189B1

(12) United States Patent
Patil et al.

(10) Patent No.: US 9,424,189 B1
(45) Date of Patent: Aug. 23, 2016

(54) SYSTEMS AND METHODS FOR MITIGATING WRITE-BACK CACHING FAILURES

(71) Applicant: Symantec Corporation, Mountain View, CA (US)

(72) Inventors: Sushil Patil, Wakad (IN); Shirish Vijayvargiya, Wakad (IN); Anindya Banerjee, Wakad (IN); Sanjay Jain, Pimple Saudagar (IN)

(73) Assignee: Veritas Technologies LLC, Mountain View, CA (US)

( * ) Notice: Subject to any disclaimer, the term of this patent is extended or adjusted under 35 U.S.C. 154(b) by 228 days.

(21) Appl. No.: 14/177,206

(22) Filed: Feb. 10, 2014

(51) Int. Cl.
*G06F 12/00* (2006.01)
*G06F 12/08* (2016.01)

(52) U.S. Cl.
CPC ........ *G06F 12/0808* (2013.01); *G06F 12/0815* (2013.01); *G06F 12/0868* (2013.01)

(58) Field of Classification Search
CPC .......................... G06F 12/0815; G06F 12/0868
USPC ......................................... 711/135, 141, 143
See application file for complete search history.

(56) References Cited

U.S. PATENT DOCUMENTS

| 7,636,814 | B1* | 12/2009 | Karr | G06F 12/0804 711/143 |
| 8,549,222 | B1* | 10/2013 | Kleiman | G06F 3/0613 711/103 |
| 8,904,117 | B1* | 12/2014 | Kalekar | G06F 12/0804 711/119 |
| 2012/0215970 | A1* | 8/2012 | Shats | G06F 12/0866 711/103 |

OTHER PUBLICATIONS

Saxena, Mohit, et al., "FlashTier: a Lightweight, Consistent and Durable Storage Cache", http://pages.cs.wisc.edu/~swift/papers/eurosys12_flashtier.pdf, as accessed Dec. 31, 2013, EuroSys'12, ACM, Bern, Switzerland, (Apr. 10-13, 2012).

* cited by examiner

*Primary Examiner* — Prasith Thammavong
(74) *Attorney, Agent, or Firm* — ALG Intellectual Property, LLC

(57) ABSTRACT

A computer-implemented method for mitigating write-back caching failures may include (1) detecting a failure that impairs at least one write-back cache that temporarily caches updates for individual files stored on a storage device, (2) identifying an attribute of an individual file stored on the storage device in response to the failure that impairs the write-back cache, (3) determining that at least a portion of the individual file is obsolete based at least in part on the attribute of the individual file, and then (4) performing at least one mitigating action with respect to the individual file to address the obsolete portion of the individual file. Various other methods, systems, and computer-readable media are also disclosed.

20 Claims, 6 Drawing Sheets

SYSTEMS AND METHODS FOR MITIGATING WRITE-BACK CACHING FAILURES

BACKGROUND

Write-back caching is often used to improve write latency in storage devices. For example, write-back caching may enable a computing device to modify data stored on a storage device by temporarily caching modifications in a write-back cache. Once the modifications cached in the write-back cache have reached a certain threshold, the write-back cache may flush the modifications to the main storage device. By caching and flushing the modifications in this way, write-back caching may reduce the number of write operations needed to modify the data stored on the storage device.

Unfortunately, some conventional write-back caching technologies may be unable to identify which files stored on a storage device correspond to modifications that have yet to be flushed from a write-back cache. As a result, in the event that a failure impairs the write-back cache's ability to flush the modifications to the storage device, such conventional write-back caching technologies may be unable to isolate and/or recover only those modifications that apply to the obsolete files stored on the storage device. Additionally or alternatively, such conventional write-back caching technologies may be unable to prevent users from accessing the obsolete files stored on the storage device or even notify users that the files they have accessed are obsolete.

The instant disclosure, therefore, identifies and addresses a need for improved systems and methods for mitigating write-back caching failures.

SUMMARY

As will be described in greater detail below, the instant disclosure generally relates to systems and methods for mitigating write-back caching failures by maintaining file attributes that indicate whether individual files stored on a storage device have become obsolete. In other words, these systems and method may associate attributes with individual files that have updates cached in a write-back cache.

In one example, a computer-implemented method for mitigating write-back caching failures may include (1) detecting a failure that impairs at least one write-back cache that temporarily caches updates for individual files stored on a storage device, (2) identifying an attribute (such as a dirty bit) of an individual file stored on the storage device in response to the failure that impairs the write-back cache, (3) determining that at least a portion of the individual file is obsolete based at least in part on the attribute of the individual file, and then (4) performing at least one mitigating action with respect to the individual file to address the obsolete portion of the individual file.

In one example, the method may also include maintaining an attribute of the individual file that indicates whether at least a portion of the individual file is obsolete. In this example, the method may further include detecting a write operation that temporarily caches the update for the individual file in the write-back cache. Additionally or alternatively, the method may include locating the attribute of the individual file and then setting the attribute of the individual file to indicate that at least a portion of the individual file is obsolete due at least in part to the update for the individual file temporarily cached in the write-back cache during the write operation.

In one embodiment, the mitigating action may include determining that the write-back cache has recovered the ability to flush updates to the storage device. In this embodiment, the mitigating action may also include directing the write-back cache to flush an update for the individual file to the storage device. The mitigating action may further include updating the individual file to address the obsolete portion of the individual file based at least in part on the flushed update. Additionally or alternatively, the mitigating action may include clearing the attribute of the individual file to indicate that the individual file is up-to-date.

In one example, the method may also include identifying at least one node that includes the write-back cache. In this example, the method may further include detecting a successful reboot of the node that includes the write-back cache.

In one example, the method may also include identifying at least one node that includes the write-back cache. In this example, the method may further include determining that communication between the storage device and the node has been restored.

In one example, the method may also include identifying at least one additional write-back cache that mirrors the write-back cache impaired by the failure. In this example, the method may further include determining that the additional write-back cache is still able to flush updates to the storage device despite the failure.

In one embodiment, the mitigating action may include directing the additional write-back cache to flush an update for the individual file to the storage device. In this embodiment, the mitigating action may also include updating the individual file to address the obsolete portion of the individual file based at least in part on the flushed update. Additionally or alternatively, the mitigating action may further include clearing the attribute of the individual file to indicate that the individual file is up-to-date.

In one embodiment, the mitigating action may include determining that no write-back cache is currently able to flush an update for the individual file to the storage device. In this embodiment, the mitigating action may also include blocking access to the individual file due at least in part to the portion of the individual file being obsolete in response to determining that no write-back cache is currently able to flush the update for the individual file to the storage device. The method may further include providing a user interface that enables a user to override the blocked access to the individual file by clearing the attribute of the individual file even though the portion of the individual file is obsolete.

In one example, a system for implementing the above-described method may include (1) a detection module that detects a failure that impairs at least one write-back cache that temporarily caches updates for individual files stored on a storage device, (2) an identification module that identifies an attribute of an individual file stored on the storage device in response to the failure that impairs the write-back cache, (3) a determination module that determines that at least a portion of the individual file is obsolete based at least in part on the attribute of the individual file, and (4) a mitigation module that performs at least one mitigating action with respect to the individual file to address the obsolete portion of the individual file. The system may also include at least one processor that executes the detection module, the identification module, the determination module, and the mitigation module.

In another example, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a failure that impairs at least one write-back cache that temporarily caches updates for individual files stored on a storage device, (2) identify an attribute of an individual file stored on the storage device in response to the failure that impairs the write-back cache, (3) determine that at least a portion of the individual file is obsolete based at least in part on the attribute of the individual file, and then (4) perform at least one mitigating action with respect to the individual file to address the obsolete portion of the individual file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
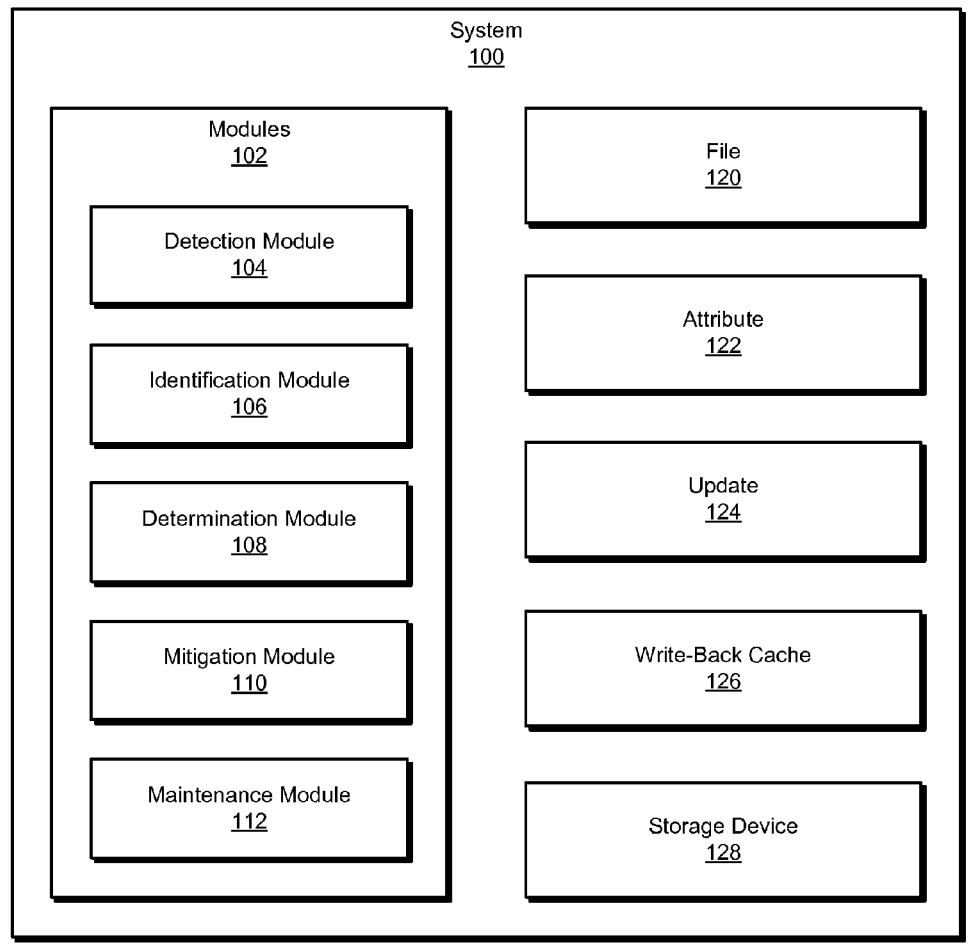
FIG. 1 is a block diagram of an exemplary system for mitigating write-back caching failures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for mitigating write-back caching failures. As will be explained in greater detail below, by maintaining file attributes that indicate whether individual files stored on a storage device have become obsolete, the various systems and methods described herein may be able to identify which individual files correspond to modifications that have yet to be flushed from a write-back cache. Moreover, by identifying which individual files correspond to such modifications, the various systems and methods described herein may be able to isolate and/or recover only those modifications that apply to the obsolete files (as opposed to redundantly recovering all of the modifications cached in the write-back cache). Additionally or alternatively, by identifying which individual files correspond to such modifications, the various systems and methods described herein may be able to prevent users from accessing the obsolete files and/or notify users that the files they have accessed are obsolete.

Figure 2:
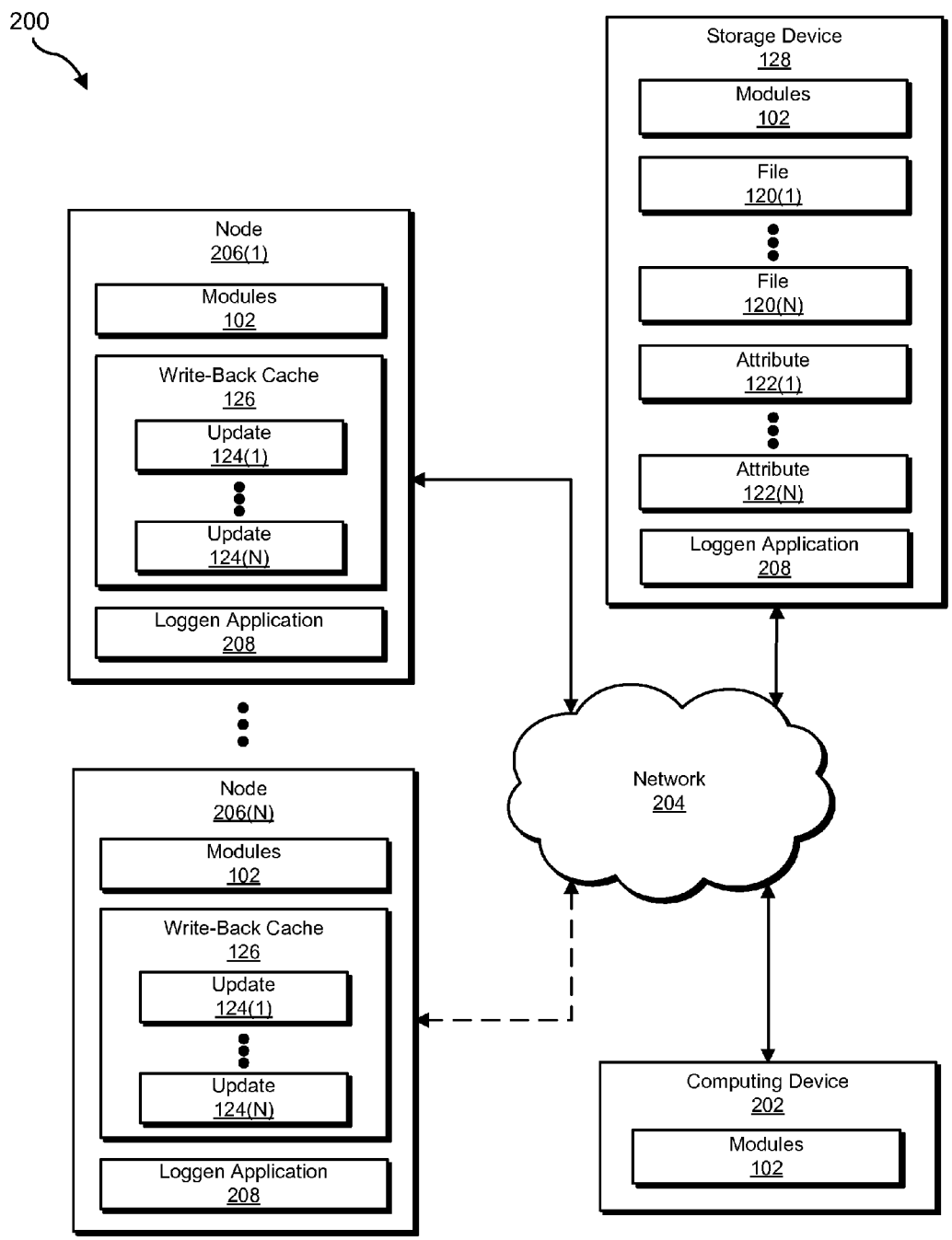
FIG. 2 is a block diagram of an additional exemplary system for mitigating write-back caching failures.

The following will provide, with reference to FIGS. 1-2, detailed descriptions of exemplary systems for mitigating write-back caching failures. Detailed descriptions of corresponding computer-implemented methods will also be provided in connection with FIG. 3. Detailed descriptions of an exemplary file, an exemplary attribute, and an exemplary update will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for mitigating write-back caching failures. As illustrated in this figure, exemplary system 100 may include one or more modules 102 for performing one or more tasks. For example, and as will be explained in greater detail below, exemplary system 100 may include a detection module 104 that detects a failure that impairs at least one write-back cache that temporarily caches updates for individual files stored on a storage device. Exemplary system 100 may also include an identification module 106 that identifies an attribute of an individual file stored on the storage device in response to the failure that impairs the write-back cache.

In addition, and as will be described in greater detail below, exemplary system 100 may include a determination module 108 that determines that at least a portion of the individual file is obsolete based at least in part on the attribute of the individual file. Exemplary system 100 may further include a mitigation module 110 that performs at least one mitigating action with respect to the individual file to address the obsolete portion of the individual file. Additionally or alternatively, exemplary system 100 may include a maintenance module 112 that maintains the attribute that indicates whether at least a portion of the individual file is obsolete. Although illustrated as separate elements, one or more of modules 102 in FIG. 1 may represent portions of a single module or application (such as SYMANTEC BACKUP EXEC, SYMANTEC NETBACKUP, SYMANTEC NORTON GHOST, ACRONIS TRUE IMAGE, ACRONIS BACKUP & RECOVERY, GENIE BACKUP HOME, or COMMVAULT SIMPANA).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., storage device 128, computing device 202, and/or nodes 206(1)-(N)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more files, such as file 120. The term "file," as used herein, generally refers to any type or form of computer file that includes data, metadata, and/or information. In one example, file 120 may include one or more data segments stored on a storage device. In this example, one or more of the data segments included in file 120 may have become obsolete due at least in part to an update and/or modification to file 120. Examples of file 120 include, without limitation, executable files, document files, data files, batch files, archive files, media files, backup files, library files, compressed files, scripts, binary code, machine code, any combination of one or more of the same, or any other suitable computer file.

As illustrated in FIG. 1, exemplary system 100 may also include one or more attributes, such as attribute 122. The term "attribute," as used herein, generally refers to any type or form of characteristic, metadata, and/or information related to a file. In one example, attribute 122 may include a dirty bit that indicates whether at least a portion of file 120 is obsolete. The phrase "dirty bit," as used herein, generally refers to any type or form of binary digit that represents a current state and/or condition of a file.

In one embodiment, when the dirty bit is set, the dirty bit may indicate that at least a portion of file 120 has been rendered obsolete by an update and/or modification to file 120. Additionally or alternatively, when the dirty bit is cleared, the dirty bit may indicate that file 120 is up-to-date.

As illustrated in FIG. 1, exemplary system 100 may also include one or more updates, such as update 124. The term "update," as used herein, generally refers to any type or form of modification and/or change to a file stored in a storage device. In one example, update 124 may include one or more data segments that represent a modification and/or change to file 120. Upon application to file 120, update 124 may effectively replace one or more obsolete data segments included in file 120 with the data segments that represent the modification and/or change to file 120.

As illustrated in FIG. 1, exemplary system 100 may also include one or more write-back caches, such as write-back cache 126. The term "write-back cache," as used herein, generally refers to any type or form of storage mechanism that stores at least a portion of one or more files. In one example, write-back cache 126 may store update 124 on a temporary or relatively short-term basis. Additionally or alternatively, write-back cache 126 may represent a short-term storage device capable of facilitating access to files faster than a long-term storage device (e.g., storage device 128 in FIGS. 1 and 2). Examples of write-back cache 126 include, without limitation, Solid-State Drives (SSDs), flash drives, disk drives, memory devices, combinations of one or more of the same, or any other suitable storage mechanism that stores at least a portion of one or more files.

As illustrated in FIG. 1, exemplary system 100 may also include one or more storage devices, such as storage device 128. The term "storage device," as used herein, generally refers to any type or form of storage mechanism that stores at least a portion of one or more files. In one example, storage device 128 may store file 120 on a permanent or relatively long-term basis. Additionally or alternatively, storage device 128 may represent a long-term storage device incapable of facilitating access to files as fast as a short-term storage device (e.g., write-back cache 126 in FIGS. 1 and 2). Examples of storage device 128 include, without limitation, storage servers, disk drives, disk arrays, tape drives, deduplication storage devices, backup storage devices, SSDs, flash drives, memory devices, combinations of one or more of the same, or any other suitable storage mechanism that stores at least a portion of one or more files.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among storage device 128, computing device 202, and/or one or more nodes 206(1)-(N). In one example, storage device 128 may be programmed with one or more of modules 102. Additionally or alternatively, storage device 128 may store one or more of files 120(1)-(N), maintain one or more of attributes 122(1)-(N), and/or include a loggen application 208.

The phrase "loggen application," as used herein, generally refers to any type or form of mechanism that generates and/or maintains a log of a file system. In one example, loggen application 208 may generate a log of a file system that includes files 120(1)-(N) stored on storage device 128. This log of the file system may include an entry for each of files 120(1)-(N) stored on storage device 128. Additionally or alternatively, loggen application 208 may maintain the log of the file system by modifying the log to account for any updates to files 120(1)-(N) stored on storage device 128.

As shown in FIG. 2, computing device 202 may be programmed with one or more of modules 102. Additionally or alternatively, computing device 202 may include a local copy (not illustrated in FIG. 2) of one or more of files 120(1)-(N). Computing device 202 may upload one or more of updates 124(1)-(N) to write-back cache 126 in response to a modification and/or change to the corresponding local copy.

As shown in FIG. 2, each of nodes 206(1)-(N) may be programmed with one or more of modules 102. Additionally or alternatively, each of nodes 206(1)-(N) may include an instance of write-back cache 126 and/or loggen application 208. Each instance of write-back cache 126 may store one or more updates 124(1)-(N) that have yet to be flushed to storage device 128.

In one embodiment, one or more of modules 102 from FIG. 1 may, when executed by at least one processor of storage device 128, computing device 202, and/or one or more of nodes 206(1)-(N), enable storage device 128, computing device 202, and/or one or more of nodes 206(1)-(N) to mitigate write-back caching failures. For example, and as will be described in greater detail below, one or more of modules 102 may cause storage device 128, computing device 202, and/or one or more of nodes 206(1)-(N) to (1) detect a failure that impairs write-back cache 126, (2) identify attribute 122(1) of file 120(1) stored on storage device 128 in response to the failure that impairs write-back cache 126, (3) determine that at least a portion of file 120(1) is obsolete based at least in part on attribute 122(1), and then (4) perform at least one mitigating action with respect to file 120(1) to address the obsolete portion of file 120(1).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Nodes 206(1)-(N) generally represent any type or form of computing device capable of maintaining a write-back cache and/or facilitating write-back caching. Examples of nodes 206(1)-(N) include, without limitation, laptops, tablets, desktops, servers, storage devices, cellular phones, PDAs, multimedia players, embedded systems, wearable devices (e.g., smart watches, smart glasses, etc.), gaming consoles, combinations of one or more of the same, exemplary computing system 510 in FIG. 5, or any other suitable node.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
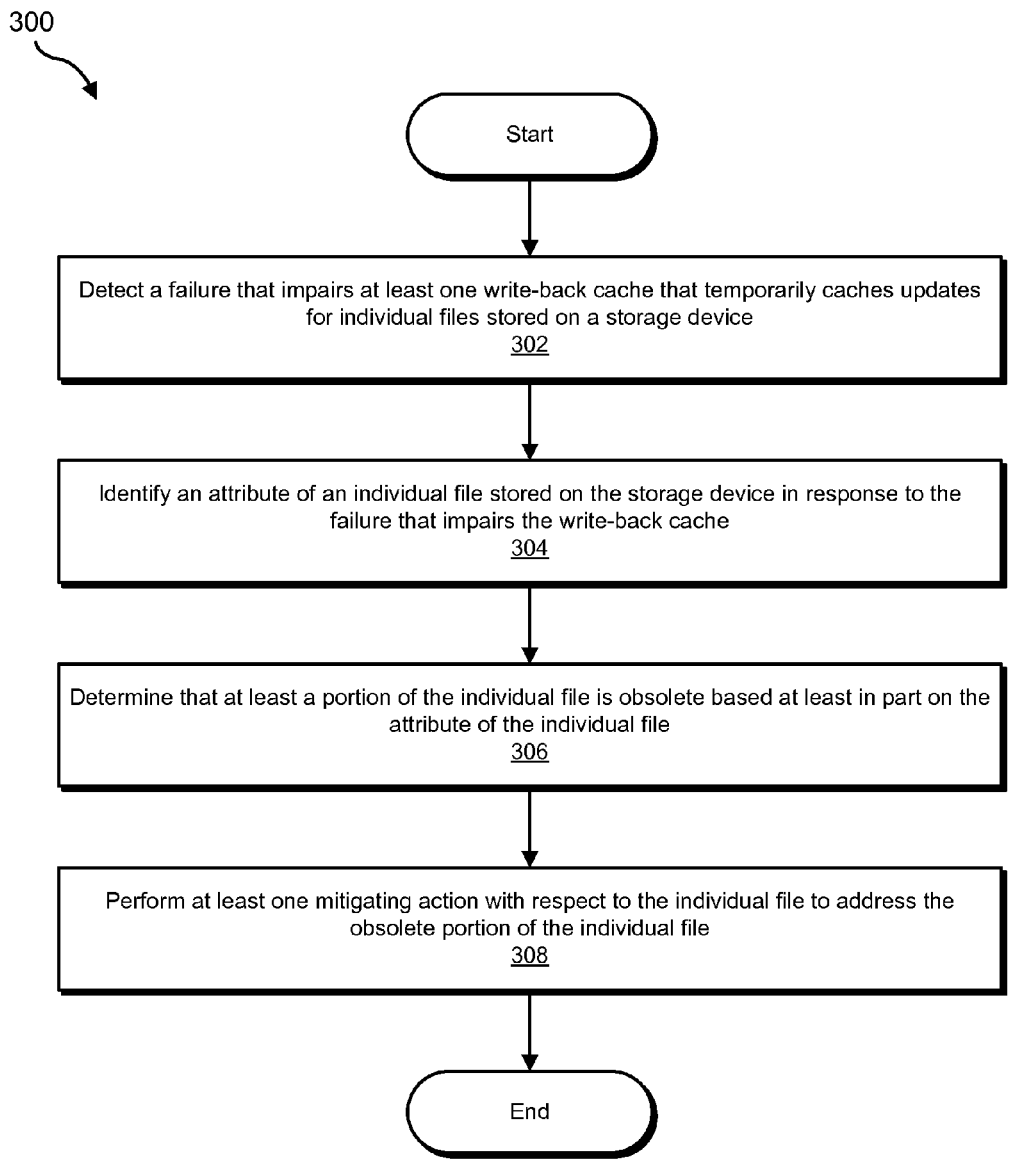
FIG. 3 is a flow diagram of an exemplary method for mitigating write-back caching failures.

FIG. 3 is a flow diagram of an exemplary computer-implemented method 300 for mitigating write-back caching failures. The phrase "write-back caching," as used herein, generally refers to any type or form of process, procedure, and/or technique that involves temporarily caching updates for individual files stored on a storage device prior to flushing the updates to the storage device. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect a failure that impairs at least one write-back cache that temporarily caches updates for individual files stored on a storage device. For example, detection module 104 may, as part of storage device 128, computing device 202, and/or node 206(1) in FIG. 2, detect a failure that impairs write-back cache 126 located on node 206(1). In this example, the failure may impair the ability of write-back cache 126 to flush updates 124(1)-(N) from node 206(1) to storage device 128. The term "flush," as used herein, generally refers to any type or form of process, procedure, and/or technique that involves transferring one or more updates from a write-back cache to a storage device.

The systems described herein may perform step 302 in a variety of ways. In some examples, detection module 104 may determine that a failure has impaired write-back cache 126 based at least in part on a communication error. For example, detection module 104 may detect an unsuccessful attempt by storage device 128 to communicate with node 206(1) via network 204. Detection module 104 may then determine that a failure has impaired the communication capability of node 206(1) based at least in part on this unsuccessful attempt to communicate with node 206(1). As a result, detection module 104 may assume and/or infer that write-back cache 126 is unable to flush updates 124(1)-(N) from node 206(1) to storage device 128.

Additionally or alternatively, detection module 104 may detect an unsuccessful attempt by computing device 202 to communicate with node 206(1) via network 204. Detection module 104 may then determine that a failure has impaired the communication capability of node 206(1) based at least in part on this unsuccessful attempt to communicate with node 206(1). As a result, detection module 104 may assume and/or infer that write-back cache 126 is unable to flush updates 124(1)-(N) from node 206(1) to storage device 128.

In some embodiments, the detected failure may include a failure that brings down and/or takes offline node 206(1). Additionally or alternatively, the detected failure may include a failure that impairs at least a portion of the communication infrastructure within network 204. As a result, write-back cache 126 may be unable to flush updates 124(1)-(N) from node 206(1) to storage device 128.

In some embodiments, one or more of files 120(1)-(N) stored on storage device 128 may have originated from computing device 202. For example, computing device 202 may include a local copy (not illustrated in FIG. 2) of file 120(1). In this example, computing device 202 may initiate a backup operation that backs up file 120(1) to storage device 128. As part of this backup operation, computing device 202 may send a backup copy of file 120(1) to node 206(1) via network 204. Upon receiving the backup copy of file 120(1), node 206(1) may cache the backup copy of file 120(1) in write-back cache 126 prior to flushing the backup copy of file 120(1) to storage device 128 at a later point in time.

Similarly, one or more of updates 124(1)-(N) cached in write-back cache 126 may have originated from computing device 202. For example, computing device 202 may modify and/or change the local copy of file 120(1). After modifying and/or changing the local copy of file 120(1), computing device 202 may initiate a backup operation that propagates this modification and/or change to storage device 128. As part of this backup operation, computing device 202 may create update 124(1) to capture this modification and/or change and then send update 124(1) to node 206(1) via network 204. Upon receiving update 124(1), node 206(1) may cache update 124(1) in write-back cache 126 prior to flushing update 124(1) to storage device 128 at a later point in time.

Returning to FIG. 3, at step 304 one or more of the systems described herein may identify an attribute of an individual file stored on the storage device in response to detecting the failure that impairs the write-back cache. For example, identification module 106 may, as part of storage device 128, computing device 202, and/or node 206(1) in FIG. 2, identify attribute 122(1) of file 120(1) stored on storage device 128 in response to the failure that impairs write-back cache 126. In this example, attribute 122(1) may indicate whether at least a portion of file 120(1) is obsolete. The term "obsolete," as used herein, generally refers to any type or form of state and/or condition in which at least a portion of a file is out-of-date and/or does not include the most up-to-date data.

The systems described herein may perform step 304 in a variety of ways. In some examples, identification module 106 may identify attribute 122(1) within a database (not illustrated in FIG. 2) located on storage device 128. For example, identification module 106 may search the database located on storage device 128 for metadata related to each file stored on storage device 128. During this search, identification module 106 may find metadata related to file 120(1) within the database. Identification module 106 may then identify attribute 122(1) in this metadata found within the database.

In some examples, identification module 106 may identify attribute 122(1) within a header of file 120(1) stored on storage device 128. For example, identification module 106 may search storage device 128 for each file stored on storage device 128. During this search, identification module 106 may find file 120(1) being stored on storage device 128. Identification module 106 may then identify attribute 122(1) within a header of file 120(1) being stored on storage device 128.

In some examples, maintenance module 112 may maintain attributes 122(1)-(N) at storage device 128. In one example, maintenance module 112 may set at least one of attributes 122(1)-(N) to indicate that at least a portion of the corresponding file has been rendered obsolete by an update. For example, detection module 104 may detect a write operation that temporarily caches update 124(1) corresponding to file 120(1) in write-back cache 126. In response to this write operation, maintenance module 112 may locate attribute 122(1) of file 120(1) at storage device 128. Maintenance module 112 may then set attribute 122(1) to indicate that at least a portion of file 120(1) has become obsolete due at least in part to update 124(1) temporarily cached in write-back cache 126 during the write operation.

In one example, maintenance module 112 may maintain attributes 122(1)-(N) in a bitmap that maps attributes 122(1)-(N) to files 120(1)-(N), respectively. Additionally or alternatively, maintenance module 112 may maintain attributes 122(1)-(N) in a list that maps attributes 122(1)-(N) to files 120(1)-(N), respectively.

Returning to FIG. 3, at step 306 one or more of the systems described herein may determine that at least a portion of the individual file is obsolete based at least in part on the attribute of the individual file. For example, determination module 108 may, as part of storage device 128, computing device 202, and/or node 206(1) in FIG. 2, determine that at least a portion of file 120(1) is obsolete based at least in part on attribute 122(1). In other words, determination module 108 may determine that attribute 122(1) indicates that an update for file 120(1) has been cached in (but not yet flushed from) write-back cache 126.

The systems described herein may perform step 306 in a variety of ways. In one example, determination module 108 may determine that at least a portion of file 120(1) is obsolete in the event that attribute 122(1) is set. For example, determination module 108 may check whether attribute 122(1) is set or cleared. Upon checking whether attribute 122(1) is set or cleared, determination module 108 may determine that attribute 122(1) is set. Determination module 108 may then determine that at least a portion of file 120(1) is obsolete since attribute 122(1) is set.

Figure 4:
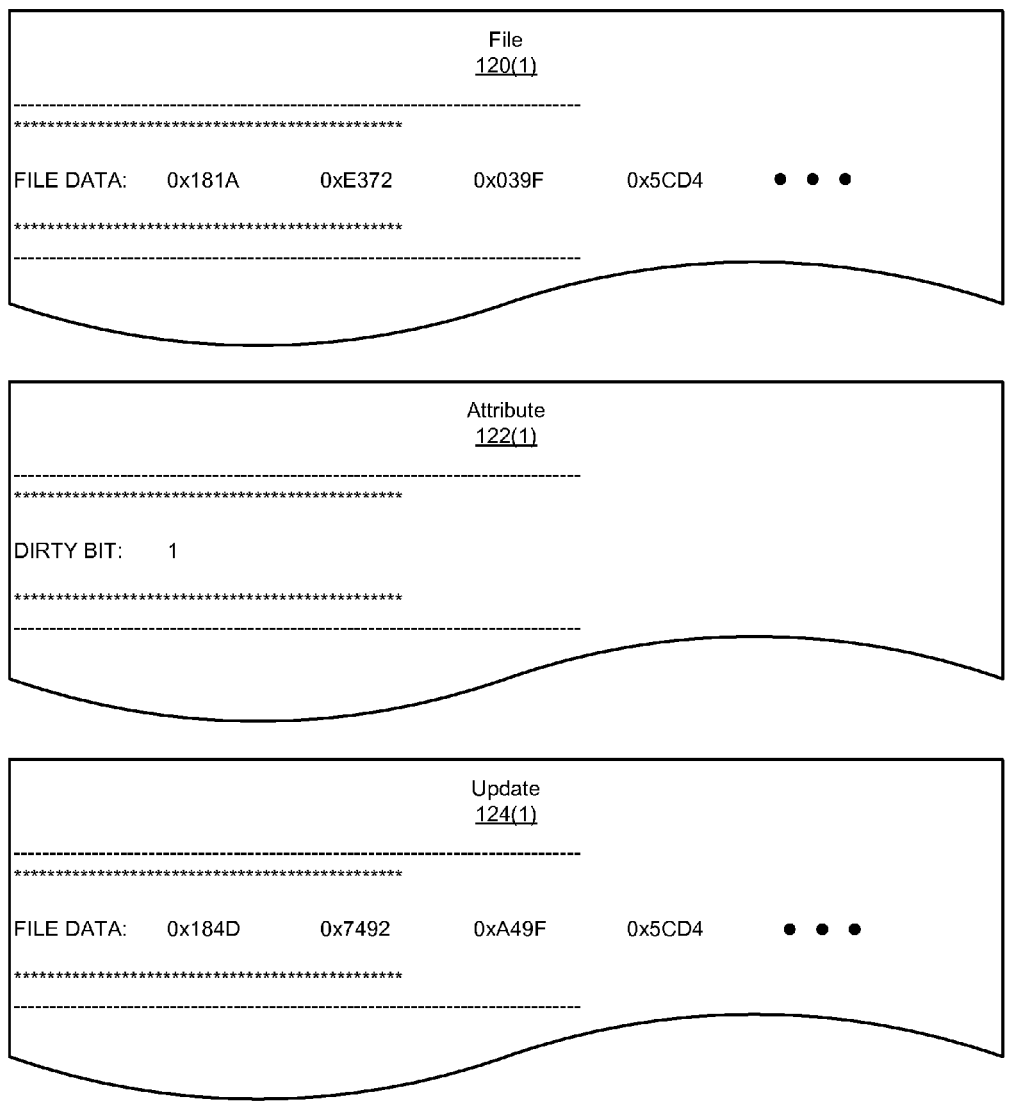
FIG. 4 is an illustration of an exemplary file, an exemplary attribute, and an exemplary update.

FIG. 4 is an illustration of exemplary file 120(1), exemplary attribute 122(1), and exemplary update 124(1). As illustrated in this figure, exemplary file 120(1) may include various file data (in this example, "0x181A," "0xE372," "0x0392," "0x5CD4," and so on), exemplary attribute 122(1) may include a dirty bit (in this example, "1") that is set to indicate that at least a portion of file 120(1) is obsolete, and exemplary update 124(1) may include various updated file data for file 120(1) (in this example, "0x184D," "0x7492," "0xA49F," and "0x5CD4," and so on). As indicated by the dirty bit included in attribute 122(1) of this example, at least a portion of the file data included in file 120(1) may have been rendered obsolete by the updated file data included in update 124(1).

Returning to FIG. 3, at step 308 one or more of the systems described herein may perform at least one mitigating action with respect to the individual file to address the obsolete portion of the individual file. For example, mitigation module 110 may, as part of storage device 128, computing device 202, and/or node 206(1) in FIG. 2, perform at least one mitigating action with respect to file 120(1) to address the obsolete portion of file 120(1). In this example, mitigation module 110 may initiate performance of the mitigating action in response to the determination that the portion of file 120(1) is obsolete.

Examples of this mitigating action include, without limitation, directing write-back cache 126 to flush update 124(1) to storage device 128, updating file 120(1) based at least in part on update 124(1), clearing attribute 122(1) to indicate that file 120(1) is up-to-date, blocking access to file 120(1) due at least in part to at least a portion of file 120(1) being obsolete, notifying a user attempting to access file 120(1) that at least a portion of file 120(1) is obsolete, combinations of one or more of the same, or any other suitable action that mitigates a write-back caching failure.

The systems described herein may perform step 308 in a variety of ways. In some examples, mitigation module 110 may address the obsolete portion of file 120(1) by updating file 120(1) based at least in part on update 124(1). For example, determination module 108 may determine that write-back cache 126 has recovered the ability to flush updates 124(1)-(N) from node 206(1) to storage device 128. In response to this determination, mitigation module 110 may direct write-back cache 126 to flush update 124(1) from node 206(1) to storage device 128 via network 204. As storage device 128 receives update 124(1) from node 206(1), mitigation module 110 may apply update 124(1) to file 120(1) and clear attribute 122(1) to indicate that file 120(1) is now up-to-date. By applying update 124(1) to file 120(1) and clearing attribute 122(1), mitigation module 110 may ensure that all user attempts to access file 120(1) on storage device 128 are directed to the most up-to-date version of file 120(1).

In some examples, determination module 108 may determine that write-back cache 126 located on node 206(1) has recovered the ability to flush updates 124(1)-(N) based at least in part on a successful reboot of node 206(1). For example, detection module 104 may detect a successful reboot of node 206(1). As a result, determination module 108 may assume and/or infer that write-back cache 126 has recovered the ability to flush updates 124(1)-(N) from node 206(1) to storage device 128.

Additionally or alternatively, determination module 108 may determine that write-back cache 126 located on node 206(1) has recovered the ability to flush updates 124(1)-(N) based at least in part on restored communication between storage device 128 and node 206(1). For example, determination module 108 may test the communication between storage device 128 and node 206(1). During this test, determination module 108 may determine that communication between storage device 128 and node 206(1) has been restored. As a result, determination module 108 may assume and/or infer that write-back cache 126 has recovered the ability to flush updates 124(1)-(N) from node 206(1) to storage device 128.

In one example, identification module 106 may identify at least one additional write-back cache that mirrors write-back cache 126 located on node 206(1). For example, identification module 106 may identify write-back cache 126 located on node 206(N). In this example, write-back cache 126 located on node 206(N) may temporarily cache updates 124(1)-(N) to ensure a certain degree of redundancy in the event that a failure impairs write-back cache 126 located on node 206(1). These mirrored write-back caches may cache updates 124(1)-(N) prior to flushing updates 124(1)-(N) to storage device 128 and/or returning the input/output (update) operation.

In one example, determination module 108 may determine that write-back cache 126 is still able to flush updates 124(1)-(N) from node 206(N) to storage device 128 despite the failure impairing write-back cache 126 located on node 206(1). For example, determination module 108 may test the communication between storage device 128 and node 206(N). During this test, determination module 108 may determine that storage device 128 and node 206(N) are still able to communicate with one another despite the failure impairing write-back cache 126 located on node 206(1). As a result, determination module 108 may assume and/or infer that write-back cache 126 is still able to flush updates 124(1)-(N) from node 206(N) to storage device 128.

In response to this determination, mitigation module 110 may direct write-back cache 126 to flush update 124(1) from node 206(N) to storage device 128 via network 204. As storage device 128 receives update 124(1) from node 206(N), mitigation module 110 may apply update 124(1) to file 120(1) and clear attribute 122(1) to indicate that file 120(1) is now up-to-date. By applying update 124(1) to file 120(1) and clearing attribute 122(1), mitigation module 110 may ensure that all user attempts to access file 120(1) on storage device 128 are directed to the most up-to-date version of file 120(1).

In some examples, mitigation module 110 may address the obsolete portion of file 120(1) by blocking access to file 120(1). For example, determination module 108 may determine that no write-back cache is currently able to flush update 124(1) to storage device 128. In response to this determination, mitigation module 110 may block all user attempts to access file 120(1) on storage device 128 due at least in part to the portion of file 120(1) being obsolete. By blocking all user attempts to access file 120(1), mitigation module 110 may ensure that no user unknowingly accesses an outdated version of file 120(1).

In one example, maintenance module 112 may override the blocked access to file 120(1) even though the portion of file 120(1) is obsolete. For example, detection module 104 may detect an attempt by a user of computing device 202 to access file 120(1) stored on storage device 128 via network 204. In response to this attempt, mitigation module 110 may notify the user of computing device 202 that at least a portion of file 120(1) is obsolete.

Additionally or alternatively, maintenance module 112 may provide the user of computing device 202 with a user interface that enables the user to override the blocked access to file 120(1). The user may then enter user input into the user interface to override the blocked access to file 120(1). Maintenance module 112 may receive the user input from the user via the user interface. In response to this user input, maintenance module 112 may clear attribute 122(1) to override the blocked access to file 120(1). As maintenance module 112 overrides the blocked access, the user may access file 120(1) even though the portion of file 120(1) is obsolete.

In some examples, determination module 108 may ensure the validity of write-back cache 126 before mitigation module 110 directs write-back cache 126 to flush update 124(1) to storage device 128. In one example, determination module 108 may direct loggen application 208 to compare the file system of storage device 128 with write-back cache 126. For example, determination module 108 may direct loggen application 208 located on storage device 128 and/or one or more of nodes 206(1)-(N) to create a mapping of files 120(1)-(N) and updates 124(1)-(N) cached in write-back cache 126. Determination module 108 may then ensure the validity of write-back cache 126 based at least in part on the mapping of files 120(1)-(N) and updates 124(1)-(N) created by loggen application 208. Once determination module 108 has ensured the validity of write-back cache 126, mitigation module 110 may direct write-back cache 126 to flush update 124(1) to storage device 128.

As explained above in connection with method 300 in FIG. 3, a backup storage device may maintain file attributes that indicate whether individual files stored on the backup storage device have become obsolete. For example, the backup storage device may detect a write operation that temporarily caches an update for an individual file in an SSD. In response to this write operation, the backup storage device may locate a dirty bit related to the individual file stored on the backup storage device. The backup storage device may then set the dirty bit related to individual file to indicate that at least a portion of the individual file has become obsolete due at least in part to the update for the individual file cached in the SSD during the write operation.

After the backup storage device has set the dirty bit related to the individual file, the SSD may experience a failure that impairs its ability to flush updates to the backup storage device. In response to this failure, the backup storage device may attempt to recover the unflushed updates from the SSD to bring the corresponding files up-to-date. For example, the backup storage device may locate all of the dirty bits related to the files stored on the backup storage device. The backup storage device may then determine that the dirty bit related to the individual file is set. As a result, the backup storage device may determine that at least a portion of the individual file is obsolete.

In response to this determination, the backup storage device may perform at least one mitigating action with respect to the individual file to address the obsolete portion of the individual file. For example, the backup storage device may determine that the SSD has recovered the ability to flush updates to the storage device and then direct the SSD to flush the update for the individual file to the backup storage device. Additionally or alternatively, the backup storage device may identify at least one additional SSD that mirrors the SSD impaired by the failure and then direct the additional SSD to flush the update for the individual file to the backup storage device. Additionally or alternatively, the backup storage device may determine that no write-back cache is currently able to flush the update for the individual file and then block access to the individual file due at least in part to the portion of the individual file being obsolete.

Figure 5:
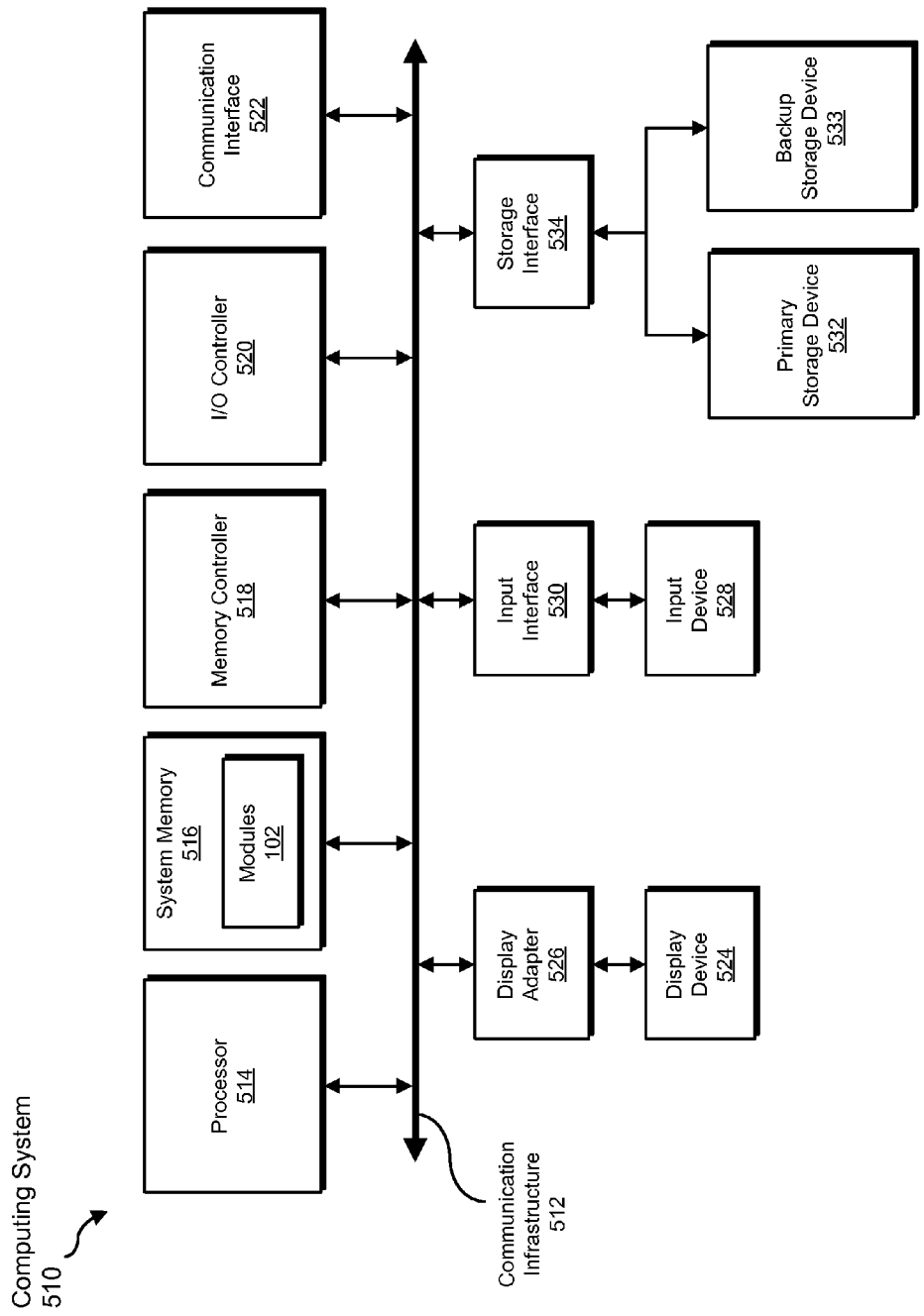
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
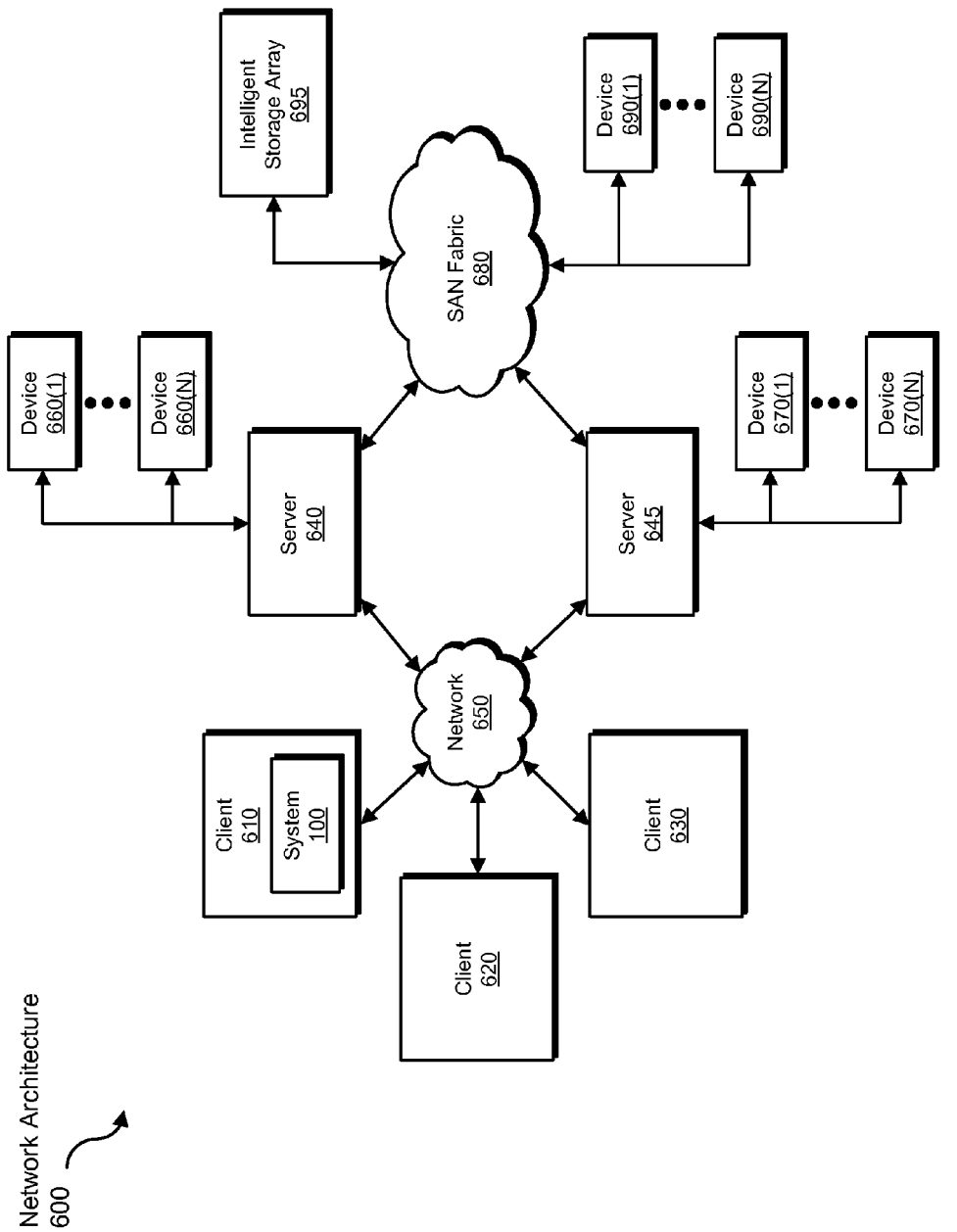
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for mitigating write-back caching failures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file, transform the file based at least in part on an update to the file, output a result of the transformation, use the result of the transformation to facilitate access to the updated file, and then store the result of the transformation for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for mitigating write-back caching failures, at least a portion of the method being performed by a computing device comprising at least one processor, the method comprising:
   detecting a failure that impairs at least one write-back cache that temporarily caches updates for individual files stored on a storage device;

in response to detecting the failure that impairs the write-back cache:
  identifying, at the storage device, an attribute of an individual file stored on the storage device;
  determining, based at least in part on the attribute of the individual file stored on the storage device, that at least a portion of the individual file stored on the storage device is obsolete;
in response to determining that the portion of the individual file stored on the storage device is obsolete, performing at least one mitigating action with respect to the individual file stored on the storage device by updating the individual file based at least in part on an update that is flushed to the storage device to address the obsolete portion of the individual file.

2. The method of claim 1, further comprising maintaining, at the storage device, the attribute of the individual file to indicate whether at least a portion of the individual file is obsolete.

3. The method of claim 2, wherein maintaining the attribute of the individual file comprises:
  detecting a write operation that temporarily caches, in the write-back cache, an update for the individual file;
  in response to detecting the write operation:
    locating, at the storage device, the attribute of the individual file that indicates whether at least a portion of the individual file is obsolete;
    setting the attribute of the individual file to indicate that at least a portion of the individual file is obsolete due at least in part to the update for the individual file temporarily cached in the write-back cache during the write operation.

4. The method of claim 1, wherein updating the individual file stored on the storage device comprises:
  determining, after detecting the failure, that the write-back cache has recovered the ability to flush updates to the storage device;
  in response to determining that the write-back cache has recovered the ability to flush updates to the storage device, directing the write-back cache to flush the update for the individual file to the storage device;
  updating, based at least in part on the flushed update, the individual file to address the obsolete portion of the individual file.

5. The method of claim 4, wherein determining that the write-back cache has recovered the ability to flush updates to the storage device comprises:
  identifying at least one node that includes the write-back cache;
  detecting a successful reboot of the node that includes the write-back cache.

6. The method of claim 4, wherein determining that the write-back cache has recovered the ability to flush updates to the storage device comprises:
  identifying at least one node that includes the write-back cache;
  determining that communication between the storage device and the node has been restored.

7. The method of claim 4, wherein updating the individual file comprises clearing the attribute of the individual file to indicate that the individual file is up-to-date.

8. The method of claim 1, further comprising:
  identifying at least one additional write-back cache that mirrors the write-back cache impaired by the failure;
  determining that the additional write-back cache is still able to flush updates to the storage device despite the failure.

9. The method of claim 8, wherein updating the individual file stored on the storage device comprises:
  directing the additional write-back cache to flush the update for the individual file to the storage device;
  updating, based at least in part on the flushed update, the individual file to address the obsolete portion of the individual file.

10. The method of claim 9, wherein updating the individual file comprises clearing the attribute of the individual file to indicate that the individual file is up-to-date.

11. The method of claim 1, wherein the attribute of the individual file comprises a dirty bit that indicates whether at least a portion of the individual file is obsolete.

12. A system for mitigating write-back caching failures, the system comprising:
  a detection module, stored in memory, that detects a failure that impairs at least one write-back cache that temporarily caches updates for individual files stored on a storage device;
  an identification module, stored in memory, that identifies, at the storage device, an attribute of an individual file stored on the storage device in response to the failure that impairs the write-back cache;
  a determination module, stored in memory, that determines, based at least in part on the attribute of the individual file stored on the storage device, that at least a portion of the individual file stored on the storage device is obsolete;
  a mitigation module, stored in memory, that performs at least one mitigating action with respect to the individual file stored on the storage device by updating the individual file based at least in part on an update that is flushed to the storage device to address the obsolete portion of the individual file;
  at least one physical processor that executes the detection module, the identification module, the determination module, and the mitigation module.

13. The system of claim 12, further comprises a maintenance module, stored in memory, that maintains, at the storage device, the attribute of the individual file to indicate whether at least a portion of the individual file is obsolete.

14. The system of claim 13, wherein:
  the detection module detects a write operation that temporarily caches, in the write-back cache, an update for the individual file;
  the maintenance module:
    locates, in response to the write operation, the attribute of the individual file that indicates whether at least a portion of the individual file is obsolete;
    sets the attribute of the individual file to indicate that at least a portion of the individual file is obsolete due at least in part to the update for the individual file temporarily cached in the write-back cache during the write operation.

15. The system of claim 13, wherein the maintenance module clears the attribute of the individual file to indicate that the individual file is up-to-date.

16. The system of claim 12, wherein:
  the determination module determines, after the detection of the failure, that the write-back cache has recovered the ability to flush updates to the storage device;
  the mitigation module updates the individual file stored on the storage device by:
    directing, in response to the determination that the write-back cache has recovered the ability to flush updates to the storage device, the write-back cache to flush the update for the individual file to the storage device;

updating, based at least in part on the flushed update, the individual file to address the obsolete portion of the individual file.

17. The system of claim 12, wherein:
the identification module identifies at least one additional write-back cache that mirrors the write-back cache impaired by the failure;
the determination module determines that the additional write-back cache is still able to flush updates to the storage device despite the failure.

18. The system of claim 17, wherein the mitigation module updates the individual file stored on the storage device by:
directing the additional write-back cache to flush the update for the individual file to the storage device;
updating, based at least in part on the flushed update, the individual file to address the obsolete portion of the individual file.

19. The system of claim 12, wherein the attribute of the individual file comprises a dirty bit that indicates whether at least a portion of the individual file is obsolete.

20. A non-transitory computer-readable medium comprising one or more computer-executable instructions that, when executed by at least one processor of a computing device, cause the computing device to:
detect a failure that impairs at least one write-back cache that temporarily caches updates for individual files stored on a storage device;
in response to detecting the failure that impairs the write-back cache:
identify, at the storage device, an attribute of an individual file stored on the storage device;
determine, based at least in part on the attribute of the individual file stored on the storage device, that at least a portion of the individual file stored on the storage device is obsolete;
perform, in response to determining that the portion of the individual file stored on the storage device is obsolete, at least one mitigating action with respect to the individual file stored on the storage device by updating the individual file based at least in part on an update that is flushed to the storage device to address the obsolete portion of the individual file.

\* \* \* \* \*